United States Patent
Lavertu et al.

(10) Patent No.: US 11,619,183 B1
(45) Date of Patent: Apr. 4, 2023

(54) METHODS AND SYSTEMS FOR MULTI-FUEL ENGINE

(71) Applicant: Transportation IP Holdings, LLC, Norwalk, CT (US)

(72) Inventors: Thomas Michael Lavertu, Ballston Lake, NY (US); Adam Edgar Klingbeil, Ballston Lake, NY (US); Eric Dillen, Edinboro, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 17/644,554

(22) Filed: Dec. 15, 2021

(51) Int. Cl.
*F02D 19/06* (2006.01)
*F02D 21/08* (2006.01)
*F02D 23/02* (2006.01)

(52) U.S. Cl.
CPC ...... *F02D 19/0605* (2013.01); *F02D 19/0613* (2013.01); *F02D 19/0644* (2013.01); *F02D 19/0647* (2013.01); *F02D 21/08* (2013.01); *F02D 23/02* (2013.01)

(58) Field of Classification Search
CPC ...... F02D 23/02; F02D 21/08; F02D 19/0647; F02D 19/0644; F02D 19/0613; F02D 19/0605
See application file for complete search history.

(56) References Cited

U.S. PATENT DOCUMENTS 8,794,212 B2 * 8/2014 Klingbeil ............ F02D 41/0027
123/299
9,903,284 B1 * 2/2018 Lavertu ................... F02D 41/38

* cited by examiner

*Primary Examiner* — Kevin A Lathers
(74) *Attorney, Agent, or Firm* — McCoy Russell LLP

(57) ABSTRACT

Methods and systems are provided for a multi-fuel engine. In one example, a method includes increasing a temperature reducing mass of a combustion mixture during a transition to multi-fuel combustion from single-fuel combustion.

20 Claims, 7 Drawing Sheets

METHODS AND SYSTEMS FOR MULTI-FUEL ENGINE

BACKGROUND

Technical Field

Embodiments of the subject matter disclosed herein relate to a multi-fuel engine, and more specifically, to adjusting operating conditions to promote higher substitution ratios.

Discussion of Art

Internal combustion engines may include compression-ignition and/or spark-ignition engines. The engine may combust multiple types of fuel. The engine may include multiple injectors positioned to inject directly into a combustion chamber and into an intake port of the engine. A substitution ratio of the engine fueling may be adjusted to adjust engine power output, emissions, engine temperature, and so forth. Some fuels, while energy dense, may be prone to generating poor combustion conditions due to a high heat of vaporization, poor mixing, and/or low flame speed. It may therefore be desirable to have methods and systems for fuel combustion which differ from those that are currently available.

BRIEF DESCRIPTION

In one embodiment, a method may include increasing a temperature reducing mass of a combustion mixture during a transition to multi-fuel combustion from single-fuel combustion. The multi-fuel combustion may include one or more of ammonia and hydrogen. The single-fuel combustion may include one of diesel, hydrogenation-derived renewable diesel (HDRD), biodiesel, syn-gas, alcohol, gasoline, kerosene, ether, and natural gas. The temperature reducing mass may include air, exhaust gas recirculation (EGR), water, and other additives depending on combustion conditions configured to reduce a cylinder temperature.

DETAILED DESCRIPTION

Figure 1:
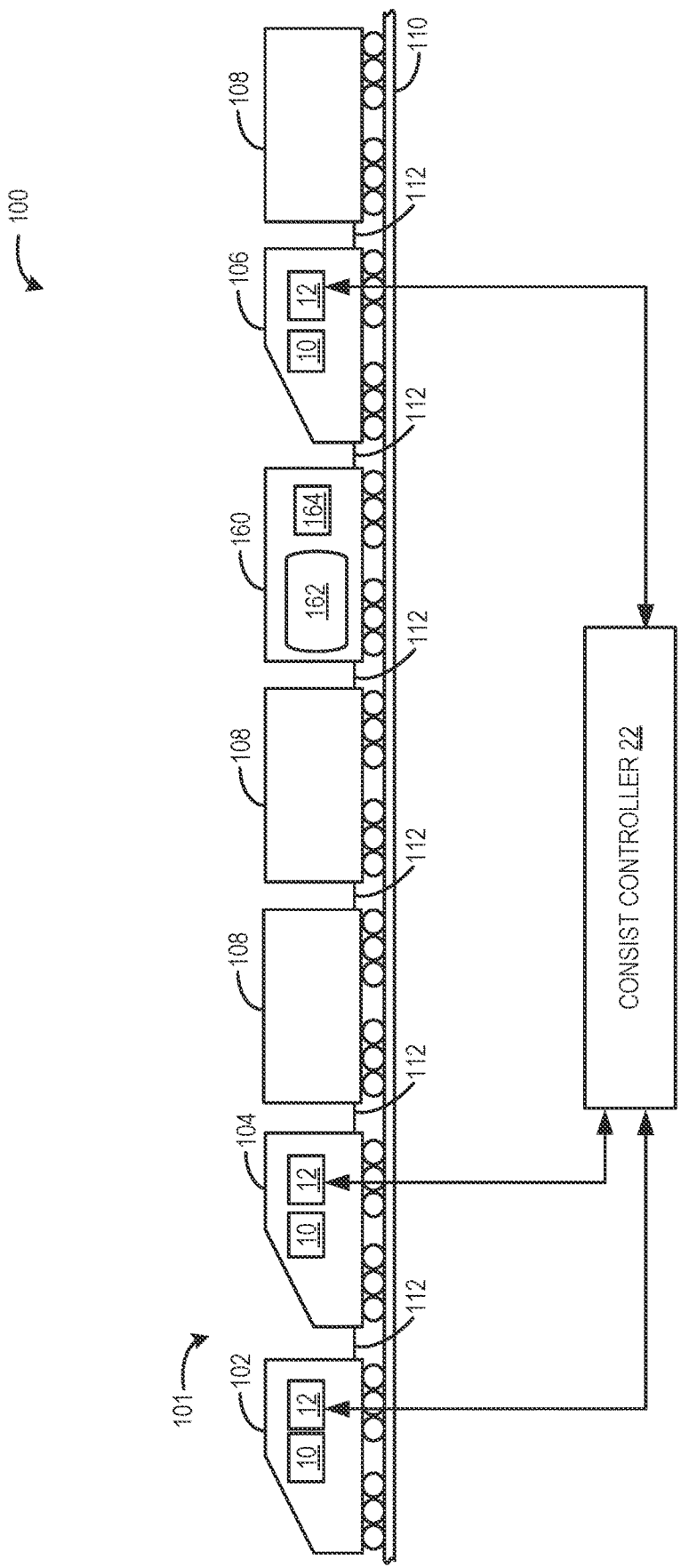
FIG. 1 shows an example embodiment of a train including a locomotive consist.

Embodiments of the invention are disclosed in the following description, and may relate to methods and systems for operating an internal combustion engine (ICE). The ICE may operate via a combination of different fuels as a mixture, and in different proportions relative to each other to form a substitution ratio of one fuel relative to another. These fuels may have relatively different amounts of carbon and suitable fuels may include one or more of gasoline, diesel, hydrogenation-derived renewable diesel (HDRD), alcohol(s), ethers, ammonia, biodiesels, hydrogen, natural gas, kerosene, syn-gas, and the like. The plurality of fuels may include gaseous fuels and liquid fuels, alone or in combination. The substitution ratio of a primary fuel of the ICE with a secondary fuel may be determined by a controller. The controller may determine the substitution ratio based at least in part on a current engine load. The controller may determine the substitution ratio based at least in part on the fuels used in the mixture, and their associated characteristics. The substitution ratio may be defined as a percentage of total fuel energy provided by the second fuel. In one embodiment, the substitution ratio may correspond to an injection amount of a fuel with a relatively lower carbon content or zero carbon content (e.g., hydrogen gas or ammonia). As the substitution ratio increases, the relative proportion of fuel with the lower or zero carbon content increases and the overall amount of carbon content in the combined fuel lowers.

In one example, the ICE may combust fuels that include both diesel and hydrogen. During some operating modes, the ICE may combust only diesel, only hydrogen, or a combination thereof (e.g., during first, second, and third conditions, respectively). When hydrogen is provided, operating conditions may be adjusted to account for the hydrogen and to promote enhanced combustion of the hydrogen. When ammonia is provided, operating conditions may be adjusted to account for the ammonia and to promote enhanced combustion of the ammonia.

In one embodiment, the engine system may combust a mixture of three or more fuels as an example: diesel, hydrogen, and ammonia. Additionally or alternatively, ethanol may be included in the combustion mixture. An engine configuration of the ICE may be adjusted to advantageously arrange one or more ammonia injectors in various locations where ammonia may premix with hot exhaust gases. By doing this, the ignitibility of ammonia may be increased without increasing engine or intake manifold temperatures to vaporize the ammonia. For example, an injector may be positioned in an exhaust port and may inject ammonia toward an exhaust valve of a combustion chamber. In some examples, the exhaust valve opening and closing may be delayed to increase exhaust gas re-ingestion when the ammonia is injected to the exhaust port. Exhaust gas re-ingestion may include where exhaust gases expelled from the combustion chamber are sucked back into the combustion chamber by maintaining the exhaust valve open during the intake stroke. Exhaust gas retention may include where the exhaust valve timing is adjusted to decrease an amount of exhaust gas expelled from the cylinder by closing the exhaust valve before a completion of an exhaust stroke. Both exhaust gas re-ingestion and exhaust gas retention may affect an exhaust gas recirculation (EGR) flow rate. The exhaust gas used in the exhaust gas re-ingestion and the exhaust gas retention may have a higher temperature relative to EGR from an EGR passage as less heat is lost to various engine materials, an EGR cooler, and an ambient atmosphere. The highest exhaust gas temperatures may vaporize the ammonia, which may enhance an ignitibility thereof. Other operating adjustments may include activating a donor cylinder, premixing diesel with ammonia via an advanced diesel injection timing, and/or injecting ammonia directly into an EGR stream. The donor cylinder may flow all or a portion of exhaust gas therefrom to another cylinder. By doing this, EGR may be delivered along a route different than an EGR passage through which the EGR stream flows. Various examples and routines for promoting ammonia combustion are described herein.

In one example, systems and methods for the multi-fuel engine may include combusting a primary fuel in combination with one or more secondary fuels. The multi-fuel engine may combust the primary fuel alone. During some conditions, the multi-fuel engine may decrease an amount of primary fuel used via substituting one or more secondary fuels into a combustion mixture. The secondary fuels may include a reduced carbon-content relative to the primary fuel. Additionally or alternatively, the secondary fuels may be less expensive, more available, and/or more efficient. The secondary fuels may vary in ignitibility and burn characteristics. An ignition timing of the multi-fuel engine may be adjusted in response to the combustion mixture to account for inclusion of the secondary fuels. For example, the ignition timing may be retarded as an amount of hydrogen is increased. As another example, the ignition timing may be advanced as an amount of ammonia is increased. The ignition timing may be further adjusted in this way in response to addition and subtraction of the primary and one or more secondary fuels to the combustion mixture. By doing this, knock, misfire, and pre-combustion may be mitigated. In one example, timing is retarded to mitigate knock and pre-combustion. As another example, timing is advanced to improve combustion efficiency or mitigate misfire.

Embodiments of the system described herein may include a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms may include self-propelled vehicles. Such vehicles can include on-road transportation vehicles (e.g., automobiles), mining equipment, marine vessels, aircrafts, rail vehicles, and other off-highway vehicles (OHVs). For clarity of illustration, a rail vehicle such as a locomotive is used as an example of a mobile platform. Suitable systems may include an engine, a turbocharger, a fuel system, and a controller or control system. Some embodiments may include an aftertreatment system or other emission reduction system. The vehicles can operate singly or may move as a group. A vehicle group may be coupled together mechanically (as in a consist) and/or virtually (as in a platoon or swarm) to coordinate their movements.

Before further discussion of the methods for increasing engine startup efficiency, an example platform in which the methods may be implemented is shown. FIG. 1 depicts an example train 100, including a plurality of rail vehicles 102, 104, 106, a fuel tender 160, and cars 108, that can run on track 110. The plurality of rail vehicles, the fuel tender, and the cars are coupled to each other through couplers 112. In one example, the plurality of rail vehicles may be locomotives, including a lead locomotive and one or more remote locomotives. While the depicted example shows three locomotives, one fuel tender, and four cars, any appropriate number of locomotives, fuel tenders, and cars may be included in the train. Further, the locomotives in the train may form a consist. For example, in the embodiment depicted, the locomotives may form consist 101. Various vehicles may form vehicle groups (such as consists, convoys, swarms, fleets, platoons, and the like). The vehicles in a group may be coupled together mechanically and/or virtually.

In some examples, the consist may include successive locomotives, e.g., where the locomotives are arranged sequentially without cars positioned in between. In other examples, as illustrated in FIG. 1, the locomotives may be separated by one or more cars in a configuration enabling distributed power operation. In this configuration, throttle and braking commands may be relayed from the lead locomotive to the remote locomotives by a radio link or physical cable, for example.

The locomotives may be powered by an engine 10, while the cars may be un-powered. In one example, the engine may be a multi-fuel engine. For example, the engine may combust gaseous and/or liquid fuels with different amounts of carbon, and in varying ratios of the fuels relative to each other. In some examples, the multi-fuel engine may be specifically a dual-fuel engine to combust two fuels, either of which may be a gaseous or liquid fuel that is hydrocarbon or non-hydrocarbon based. In other examples, the engine may be a single-fuel engine that can combust a gaseous or a liquid fuel.

The train may further include a control system. The control system may include at least one engine controller 12 and it may include at least one consist controller 22. As depicted in FIG. 1, each locomotive includes an engine controller. The engine controller may be in communication with the consist controller. The consist controller may be located on one vehicle of the train, such as the lead locomotive, or may be remotely located, for example, at a dispatch center. The consist controller may receive information from, and transmit signals to, each of the locomotives of the consist. For example, the consist controller may receive signals from a variety of sensors on the train and adjust train operations accordingly. The consist controller is also coupled to each engine controller for adjusting engine operations of each locomotive.

The train may include at least one fuel tender, which may carry one or more fuel storage tanks 162 and includes a controller 164. While the fuel tender is positioned in front of the remote locomotive 106, other examples may include alternate locations of the fuel tender along the train. For example, the fuel tender may be instead positioned behind the remote locomotive or between the lead locomotive and the remote locomotive.

Figure 2:
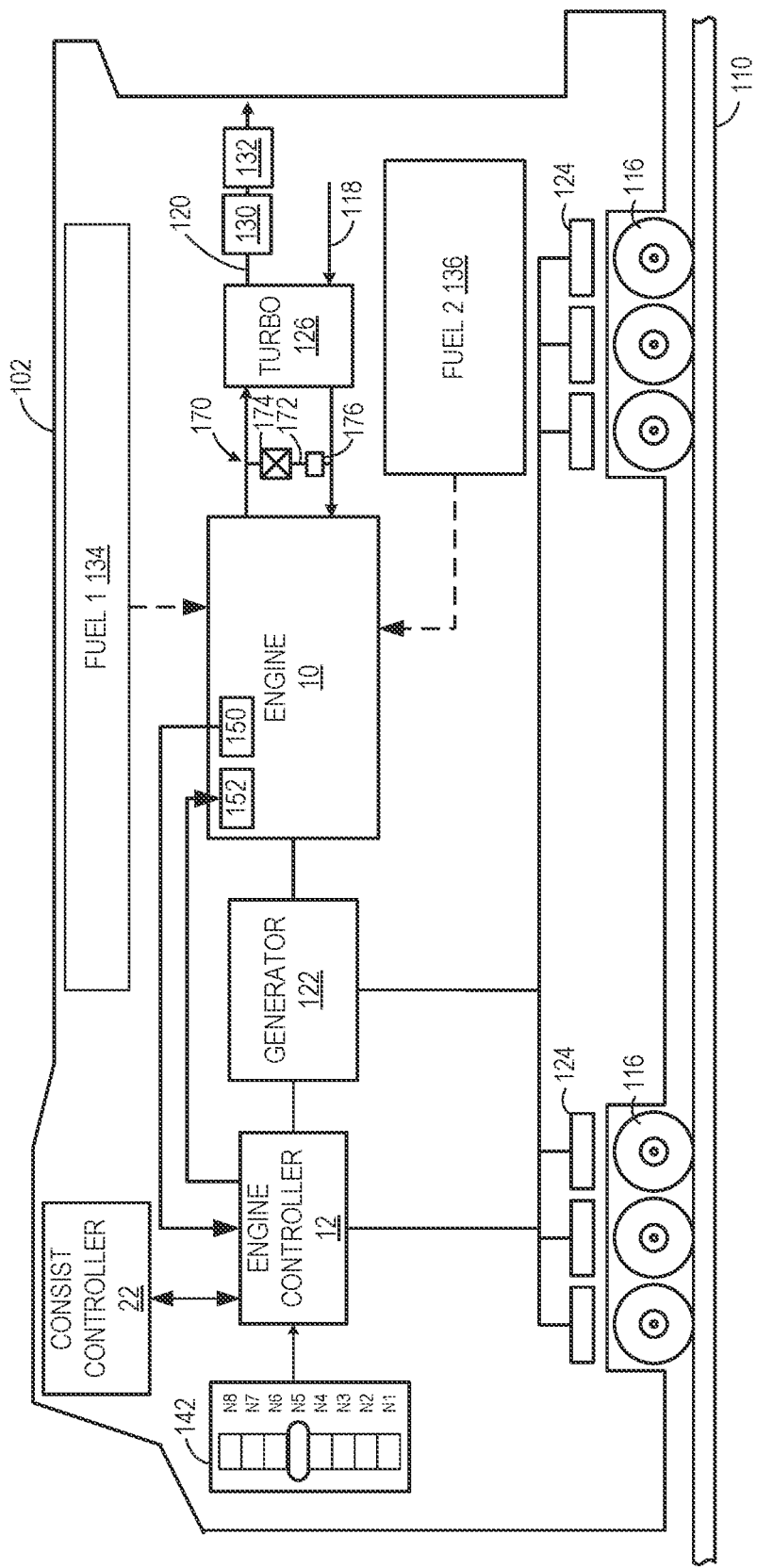
FIG. 2. shows a schematic diagram of an example embodiment of a locomotive from FIG. 1 with a dual fuel engine.
Figure 3:
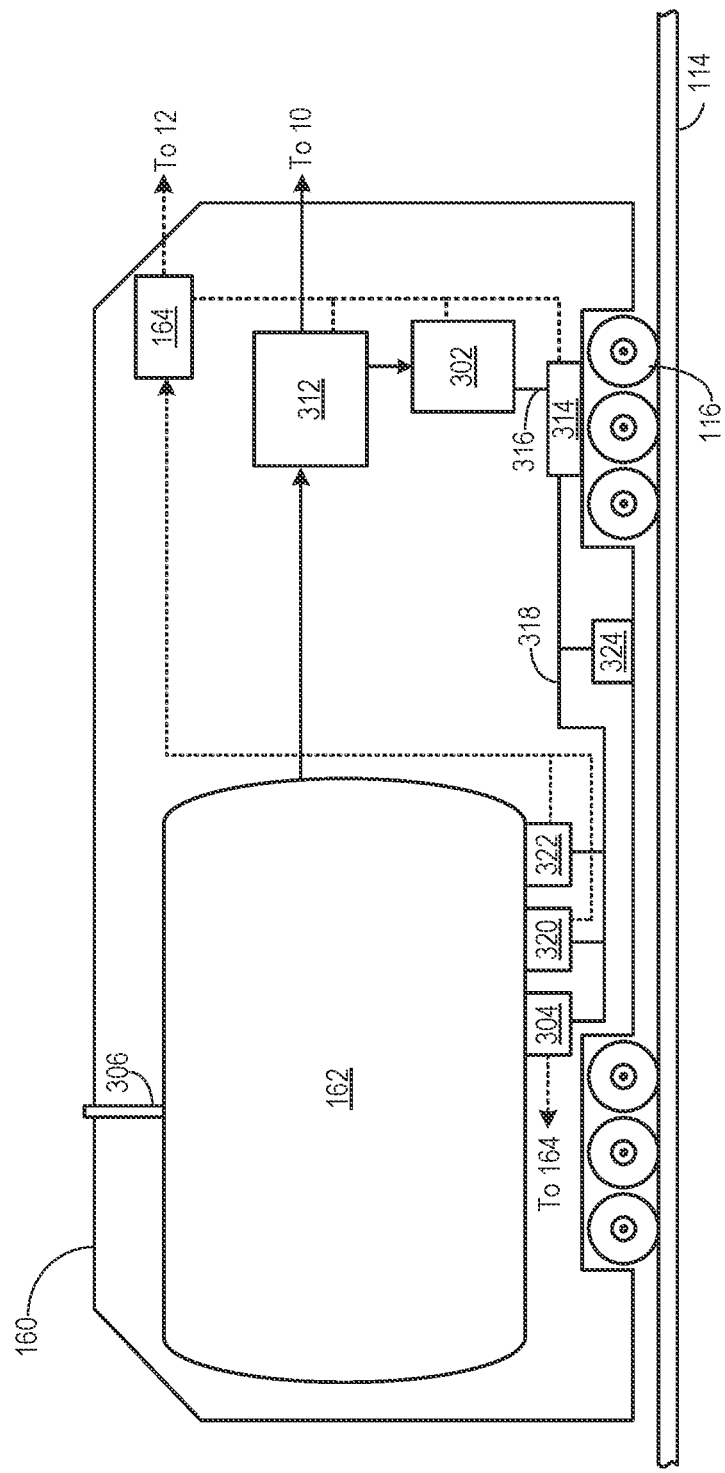
FIG. 3 shows an example embodiment of a fuel tender which may be include in the train of FIG. 1.

In one example, the fuel tender may be un-powered for propulsion, e.g., without an engine or electric traction motors (e.g., electric traction motors 124 shown in FIG. 2). However, in other examples, the fuel tender may be powered for propulsion. For example, as shown in FIG. 3, the fuel tender may include an engine. The engine of the fuel tender may combust the fuel stored in the fuel storage tank and/or fuel stored at another vehicle of the train.

The one or more fuel storage tanks of the fuel tender may have a suitable structure for storing a specific type of fuel. In one example, the fuel storage tank may be adapted for cryogenic storage of liquefied natural gas (LNG). As another example, the fuel storage tank may store a fuel in a liquid state at ambient temperature and pressure, such as diesel or ammonia. In yet another example, the fuel storage tank may store a fuel as a compressed gas, such as hydrogen or natural gas. In each instance, the fuel tender may be equipped with various mechanisms and devices for storage of the particular fuel. Further details of the fuel tender are shown further below, with reference to FIG. 3.

In some examples, fuel may be stored only at the fuel tender. In other examples, fuel may be stored both at the fuel tender and at one or more of the locomotives, e.g., as shown in FIG. 2. In addition, in some instances the fuel tender may store a fuel cell system, including a fuel cell and one or more tanks of compressed hydrogen gas. Alternatively, the fuel cell system may be stored at one or more of the locomotives.

FIG. 2 depicts an example embodiment of a locomotive as part of a train that can run on the track 110 via a plurality of wheels 116. Power for propulsion of the locomotive may be supplied at least in part by the engine. The engine receives intake air for combustion from an intake passage 118. The intake passage receives filtered ambient air from an air filter (not shown). Exhaust gas resulting from combustion in the engine is supplied to an exhaust passage 120. Exhaust gas flows through the exhaust passage, and out of an exhaust stack (not shown) of the locomotive.

In one embodiment, the engine operates as a compression ignition engine. In another embodiment, the engine operates as a spark ignition engine. The engine may combust one specific fuel type only or may be able to combust two or more types of fuel, e.g., a multi-fuel engine. As such, the different fuel types may be combusted individually or co-combusted, e.g., combusted concurrently, at the engine. In one embodiment, the multi-fuel engine may be a dual fuel engine, as depicted in FIG. 2, and the dual fuel engine may receive a first fuel from a first fuel reservoir 134 and a second fuel from a second fuel reservoir 136.

While the locomotive is equipped with two fuel reservoirs in FIG. 2, in other examples, the locomotive may include only one fuel reservoir or no fuel reservoir. For example, at least one of the fuel reservoirs may be stored at the fuel tender, e.g., the fuel tender 160 of FIG. 1. Alternatively, a third fuel may be stored at the fuel tender in addition to the first fuel at the first fuel reservoir and the second fuel at the second fuel reservoir of the locomotive. In one example, fuels which may be stored at ambient pressure and temperature without any additional equipment or specialized storage tank configurations, such as diesel, may be stored at the locomotive. Fuels demanding specialized equipment, such as for cryogenic or high pressure storage, may be stored on-board the fuel tender. In other examples, however, the locomotive and the fuel tender may each store fuels that do not demand specialized equipment.

The first, second, and third fuels (e.g., any fuels stored on-board the train) may each be any of a number of different fuel types. For example, the types of fuel may include carbon-based fuels, such as diesel, natural gas, methanol, ethanol, propanol, butanol, other alcohols, dimethyl ether (DME), other ethers, biodiesel, HDRD, syn-gas, etc. Alternatively, the fuels may be non-hydrocarbon-based fuels, such as hydrogen, ammonia, etc. The fuels listed above are non-limiting examples of fuels which may be combusted at the engine and various other types of fuels are possible.

Additionally, each of the stored fuels may be a gaseous or a liquid phase fuel. Thus, when configured as a compression ignition engine combusting a single fuel type, the engine may consume a gaseous fuel or a liquid fuel. When the compression ignition engine is a multi-fuel engine, the engine may combust only liquid fuels, only gaseous fuels, or a combination of liquid and gaseous fuels. Similarly, when configured as a spark ignition engine combusting a single fuel type, the engine may also consume either a gaseous fuel or a liquid fuel. When configured as a multi-fuel spark ignition engine, the engine may combust only liquid fuels, only gaseous fuels, or a combination of liquid and gaseous fuels.

As either of the spark ignition or the compression ignition multi-fuel engine configurations, the engine may combust fuel combinations in different manners. For example, one fuel type may be a primary combustion fuel and another fuel type may be a secondary, additive fuel used under certain conditions to adjust combustion characteristics. For example, during engine startup, a fuel combustion mixture may include a smaller proportion of diesel to seed ignition while hydrogen may form a larger proportion of the mixture. In other examples, one fuel may be used for pilot injection prior to injection of the primary combustion fuel. In some examples, the substitution rate may be set based on one or more conditions to increase an amount of carbon-free fuel to decrease carbon emissions. A ratio of carbon-free fuels used may be adjusted based on a desired ignition timing, wherein the desired ignition timing is based on one or more of an engine load, an intake manifold temperature and pressure, and a combustibility of the fuel mixture.

The engine, as the multi-fuel engine, may combust various combinations of the fuels and the fuels may be premixed or not premixed prior to combustion. In one example, the first fuel may be hydrogen and the second fuel may be diesel. In another example, the first fuel may be ammonia and the second fuel may be diesel. In yet another example, the first fuel may be ammonia and the second fuel may be ethanol. Further combinations are possible with storage of the third fuel on the fuel tender. For example, LNG may be stored at the fuel tender and the engine may combust LNG and hydrogen, or LNG, diesel, and hydrogen, or LNG, ammonia, and hydrogen. As such, numerous combinations of fuel types are possible, where the combinations may be determined based on compatibility of the fuels. A method of delivery of the fuels to the engine for combustion may similarly depend on properties of the fuel type.

When engine conditions permit combustion of only a single fuel (either spark ignition or compression ignition), the engine may consume a single liquid phase fuel. For example, the engine may combust diesel, gasoline, ammonia, LNG, or another liquid phase fuel. Similarly, the engine may combust a single gaseous fuel, such as hydrogen, or another gaseous fuel.

A fuel that is stored on-board in one physical state, e.g., gas or liquid, may be delivered to the engine in the same state or a different state. For example, LNG may be stored cryogenically in the liquid phase but may undergo a transition to the gas phase, e.g., at a regasification unit in the fuel tender, prior to injection at the engine. Other fuels, however, may be stored as a liquid and injected as a liquid or stored as a gas and injected as a gas.

Fuels may be injected at the engine according to more than one injection technique, for example. In one example, one or more of the fuels may be delivered to the engine cylinders via an indirect injection method, such as intake-port injection and/or exhaust-port injection. In another example, at least one of the fuels may be introduced to the engine cylinders via direct injection. In yet another example, at least one of the fuels may be injected by central manifold injection. The engine may receive the fuels exclusively by indirect injection, exclusively by direct injection, or by a combination of indirect and direct injection. As one example, the fuels may be injected via port injection during low loads and by direct injection during high loads. In particular, when one of the fuels is a gaseous fuel, premixing the gaseous fuel, with air and/or EGR, may be desirable via port injection. The fuels may also be premixed when introduced by central manifold injection. Premixing by direct injection is possible, such as by injection of the gaseous fuel during an intake stroke of the engine cylinders. Additionally or alternatively, a location of injection of one or more fuels may be based on a combustibility of a fuel. For example, ammonia may be injected indirectly and premixed with boost air and/or EGR to enhance the combustibility and vaporization thereof.

Each type of injection may include injection of either gaseous or liquid phase fuels. However, some injection methods may be more suitable for certain fuels depending on specific properties of the fuel type. For example, hydrogen may be injected by port injection or direct injection. Liquid phase fuels, such as diesel, may be injected by direct injection. Ammonia and natural gas may each be selectively injected by port injection or direct injection. Similarly, fuels such as methanol and ethanol may be either port injected or direct injected. In some instances, the engine may have fuel injectors capable of switching between injection of gaseous fuels and of liquid fuels.

The fuels combusted by the multi-fuel engine, whether in the gas phase or liquid phase, may or may not be premixed prior to combustion according to the type of fuel. For example, depending on operating conditions, premixing of hydrogen, natural gas, ammonia, methanol, ethanol, and DME may be desirable. During other operating conditions, fuels such as diesel, hydrogen, natural gas, methanol, and ethanol may not be premixed. For example, a greater magnitude of premixing hydrogen may be desired at higher loads and a lower magnitude of premixing hydrogen may be desired at lower loads. Premixing of the fuels may include port injection of at least one of the fuels into an inlet manifold or inlet port where the fuel may mix with air before entering a cylinder. As another example, each of the fuels may be port injected, allowing the fuels to mix with one another and with air prior to combustion. In other examples, the fuel(s) may be injected into a pre-combustion chamber fluidly coupled to a cylinder head where the fuel(s) may mix with air in the pre-combustion chamber before flowing to the cylinder head.

Alternatively, as described above, the fuels may be delivered to the engine cylinders by directly injecting one or more fuels into the engine cylinders when the cylinders are filled with at least the compressed air and, in some instances, the gas phase fuel. Direct injection may include high pressure direct injection (HPDI) and low pressure direct injection (LPDI). When direct injected, the fuels may not be premixed, in one example. However, in another example, premixing may be enabled by direct injection of one or more of the fuels prior to a compression stroke of the engine cylinders, as described above.

For embodiments of the engine where the first fuel is hydrogen and the second fuel is diesel, premixing of the hydrogen with air, for injection method, via may provide more stable air/fuel mixtures at low engine speeds and smoother engine startups. However, at higher engine speeds, port injection of the hydrogen may increase a likelihood of engine knock. Direct injection of the hydrogen may mitigate knock. Thus, in some examples, combined application of port injection of hydrogen at low engine speeds and direct injection of hydrogen at high engine speeds to mitigate knock may be desirable. Additionally or alternatively, a fuel with a lower combustibility, such as ammonia, may be premixed with hydrogen to mitigate knock.

Furthermore, a type of gaseous fuel used may determine whether direct injection of the fuel may include HPDI or LPDI, or both HPDI and LPDI. For example, hydrogen, when stored as a compressed gas, may be injected by HPDI or by LPDI, depending on engine load and available delivery pressure. In particular, HPDI of hydrogen may alleviate knock due to continuous burning of the hydrogen as the hydrogen mixes in the engine cylinders. Furthermore, HPDI may enable greater substitution rates of hydrogen, e.g., substituting for diesel, for example, thereby decreasing hydrocarbon, $NO_x$, and particulate matter emissions during engine operation.

As shown in FIG. 2, the engine is coupled to an electric power generation system, which includes an alternator/generator 122 and the electric traction motors. For example, the engine generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to the electric traction motors and the alternator/generator may provide electrical power to the electric traction motors. As depicted, the electric traction motors are each connected to one of a plurality of wheels 116 to provide tractive power to propel the locomotive. One example locomotive configuration includes one traction motor per wheel. As depicted herein, six pairs of traction motors correspond to each of six pairs of wheels of the locomotive.

The locomotive may have one or more turbochargers 126 arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger. The wastegate may be opened, for example, to divert the exhaust gas flow away from the turbine. In this manner, the rotating speed of the compressor, and thus the boost provided by the turbocharger to the engine may be regulated.

The locomotive may include an exhaust gas recirculation (EGR) system 170. The EGR system may route exhaust gas from the exhaust passage upstream of the turbocharger to the intake passage downstream of the turbocharger. The EGR system includes an EGR passage 172 and an EGR valve 174 for controlling an amount of exhaust gas that is recirculated from the exhaust passage of the engine to the intake passage of the engine. By introducing exhaust gas to the engine, the amount of available oxygen for combustion is decreased, thereby reducing the combustion flame temperatures and reducing the formation of nitrogen oxides (e.g., $NO_x$). The EGR valve may be an on/off valve controlled by the locomotive controller, or it may control a variable amount of EGR, for example.

The EGR system may further include an EGR cooler 176 to reduce the temperature of the exhaust gas before it enters the intake passage. As depicted in the non-limiting example embodiment of FIG. 2, the EGR system is a high-pressure EGR system. In other embodiments, the locomotive may additionally or alternatively include a low-pressure EGR system, routing EGR from a location downstream of the turbocharger to a location upstream of the turbocharger relative to a direction of exhaust gas flow. Additionally, the EGR system may be a donor cylinder EGR system where one or more cylinders provide exhaust gas only to the EGR passage, and then to the intake. Additionally or alternatively, the donor cylinder EGR system may include routing exhaust gases directly to one or more adjacent cylinders.

The locomotive includes an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DOC may oxidize exhaust gas components, thereby decreasing carbon monoxide, hydrocarbons, and particulate matter emissions. The DPF can trap particulates, also known as particulate matter (an example of which is soot), produced during combustion, and may be ceramic, silicon carbide, or any suitable material. In other embodiments, the exhaust gas treatment system may additionally include a selective catalytic reduction (SCR) catalyst, three-way catalyst, NO trap, various other emission control devices or combinations thereof. In some embodiments, the exhaust gas treatment system may be positioned upstream of the turbocharger, while in other embodiments, the exhaust gas treatment system may be positioned downstream of the turbocharger.

The locomotive may further include a throttle 142 coupled to the engine to indicate power levels. In this embodiment, the throttle is depicted as a notch throttle. However, any suitable throttle is within the scope of this disclosure. Each notch of the notch throttle may correspond to a discrete power level. The power level indicates an amount of load, or engine output, placed on the locomotive and controls the speed at which the locomotive will travel. Although eight notch settings are depicted in the example embodiment of FIG. 2, in other embodiments, the throttle notch may have more than eight notches or less than eight notches, as well as notches for idle and dynamic brake modes. In some embodiments, the notch setting may be selected by a human operator of the locomotive. In one example, a value of the notch setting corresponds to an engine load, wherein a higher value is equal to a higher engine load. In other embodiments, the consist controller may determine a trip plan (e.g., a trip plan may be generated using trip optimization software, such as Trip Optimizer system (available from Wabtec Corporation) and/or a load distribution plan may be generated using consist optimization software such as Consist Manager (available from Wabtec Corporation) including notch settings based on engine and/or locomotive operating conditions, as will be explained in more detail below.

The engine controller may control various components related to the locomotive. As an example, various components of the locomotive may be coupled to the engine controller via a communication channel or data bus. In one example, the engine controller and the consist controller each include a computer control system. The engine controller and consist controller may additionally or alternatively include a memory holding non-transitory computer readable storage media (not shown) including code for enabling on-board monitoring and control of locomotive operation. The engine controller may be coupled to the consist controller, for example, via a digital communication channel or data bus.

Both the engine controller and the consist controller may receive information from a plurality of sensors and may send control signals to a plurality of actuators. The engine controller, while overseeing control and management of the locomotive, may receive signals from a variety of engine sensors 150, as further elaborated herein, in order to determine operating parameters and operating conditions, and correspondingly adjust various engine actuators 152 to control operation of the locomotive. For example, the engine controller may receive signals from various engine sensors including, but not limited to, engine speed, engine load, intake manifold air pressure, boost pressure, exhaust pressure, ambient pressure, ambient temperature, exhaust temperature, engine temperature, exhaust oxygen levels, etc. Correspondingly, the engine controller may control the locomotive by sending commands to various components such as the electric traction motors, the alternator/generator, cylinder valves, fuel injectors, the notch throttle, etc. Other actuators may be coupled to various locations in the locomotive.

The consist controller may include a communication portion operably coupled to a control signal portion. The communication portion may receive signals from locomotive sensors including locomotive position sensors (e.g., GPS device), environmental condition sensors (e.g., for sensing altitude, ambient humidity, temperature, and/or barometric pressure, or the like), locomotive coupler force sensors, track grade sensors, locomotive notch sensors, brake position sensors, etc. Various other sensors may be coupled to various locations in the locomotive. The control signal portion may generate control signals to trigger various locomotive actuators. Example locomotive actuators may include air brakes, brake air compressor, traction motors, etc. Other actuators may be coupled to various locations in the locomotive. The consist controller may receive inputs from the various locomotive sensors, process the data, and trigger the locomotive actuators in response to the processed input data based on instruction or code programmed therein corresponding to one or more routines. Further, the consist controller may receive engine data (as determined by the various engine sensors, such as an engine coolant temperature sensor) from the engine controller, process the engine data, determine engine actuator settings, and transfer (e.g., download) instructions or code for triggering the engine actuators based on routines performed by the consist controller back to the engine controller.

For example, the consist controller may determine a trip plan to distribute load amongst all locomotives in the train, based on operating conditions. In some conditions, the consist controller may distribute the load unequally, that is, some locomotives may be operated at a higher power setting, or higher notch throttle setting, than other locomotives. The load distribution may be based on a plurality of factors, such as fuel economy, coupling forces, tunneling operating, grade, etc. In one example, the load distribution may be adapted based on a distribution of the locomotive consist, e.g., a positioning of each of the locomotives of the locomotive consist, across the train. For example, at least one locomotive may be positioned at an end of the train and at least one locomotive may be positioned at a front of the train. The locomotive at the end of the train may push propulsion of the train and the locomotive at the front of the train may pull the train, particularly during uphill navigation. As such, a greater load may be placed on the pushing locomotive at the end of the train.

Turning now to FIG. 3, an embodiment of the fuel tender 160 of FIG. 1 is shown. As described above, the fuel tender includes the fuel storage tank, the controller 164, and an engine 302. The fuel tender may further include a first unit 304, which may be a device for controlling a temperature and pressure within the fuel storage tank. For example, when LNG is stored in the fuel storage tank, the first unit may be a cryogenic unit. The fuel storage tank sizes and configurations may be selected based on end use parameters, may be removable from the fuel tender, and may receive fuel from an external refueling station via port 306.

The fuel storage tank may supply fuel to a fuel modification unit 312. The fuel modification unit may adjust a characteristic of the fuel. For example, the fuel may be converted from a liquid phase to a gas phase at the fuel modification unit, such as when the fuel is LNG. As another example, the fuel modification unit may be a pump to adjust a delivery pressure of the fuel when the fuel is stored in the gas phase. In other examples, where fuel modification is not demanded, the fuel modification unit may be omitted. The fuel may be delivered from the fuel modification unit to engines of the locomotives.

By supplying fuel from the fuel storage tank to the locomotive engines and the engine of the fuel tender, the fuel may be combusted by the engines distributed across the train. In another non-limiting embodiment, the fuel tender engine may generate electricity that may be delivered to one or more components on-board the fuel tender and/or on-board the locomotives. In one example, as depicted in FIG. 3, the fuel tender engine may generate torque that is transmitted to a power conversion unit 314 via drive shaft 316. The power conversion unit may convert the torque into electrical energy that is delivered via electrical bus 318 to a variety of downstream electrical components in the fuel tender. Such components may include, but are not limited to, the first unit, the fuel modification unit, the controller, a pressure sensor 320, a temperature sensor 322, batteries 324, various valves, flow meters, additional temperature and pressure sensors, compressors, blowers, radiators, batteries, lights, on-board monitoring systems, displays, climate controls, and the like, some of which are not illustrated in FIG. 3 for brevity. Additionally, electrical energy from the electrical bus may be provided to one or more components of the locomotives.

In one example the power conversion unit includes an alternator (not shown) that is connected in series to one or more rectifiers (not shown) that convert the alternator's AC electrical output to DC electrical power prior to transmission along the electrical bus. Based on a downstream electrical component receiving power from the electrical bus, one or more inverters may invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The controller on-board the fuel tender may control various components on-board the fuel tender, such as the fuel modification unit, the fuel tender engine, the power conversion unit, the first unit, control valves, and/or other components on-board the fuel tender, by sending commands to such components. The controller may also monitor fuel tender operating parameters in active operation, idle and shutdown states. Such parameters may include, but are not limited to, the pressure and temperature of the fuel storage tank, a pressure and temperature of the fuel modification unit, the fuel tender engine temperature, pressure, and load, compressor pressure, heating fluid temperature and pressure, ambient air temperature, and the like. In one example, the fuel tender controller may execute code to auto-stop, auto-start, operate and/or tune the engine and the fuel modification unit in response to one or more control system routines. The computer readable storage media may execute code to transmit to and receive communications from the engine controllers on-board the locomotives.

The fuel tender depicted in FIG. 3 is a non-limiting example of how the fuel tender may be configured. In other examples, the fuel tender may include additional or alternative components. As an example, the fuel tender may further include one or more additional sensors, flow meters, control valves, various other device and mechanisms for controlling fuel delivery and storage conditions, etc.

Figure 4:
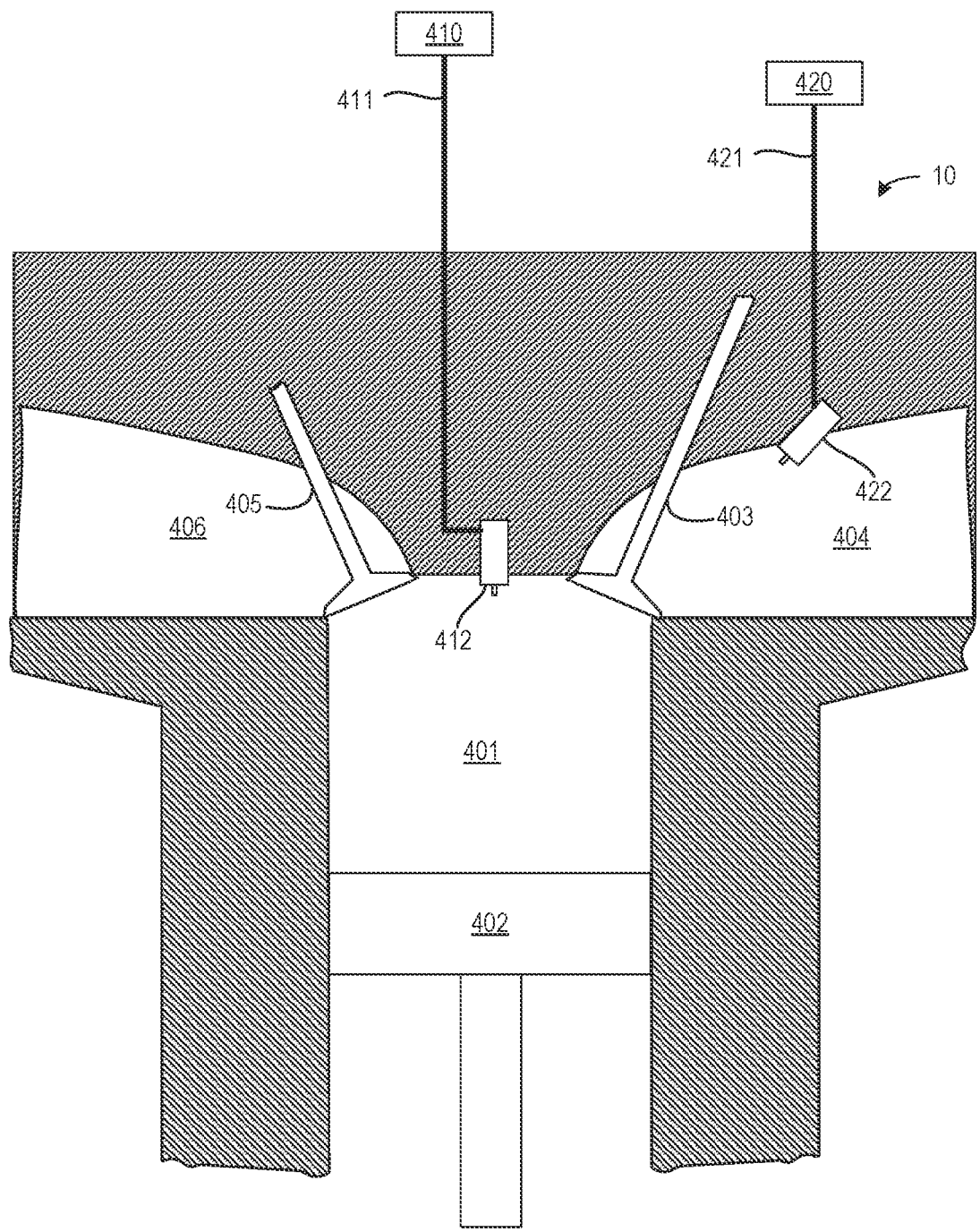
FIG. 4 shows a detailed view of an engine system.
Figure 5:
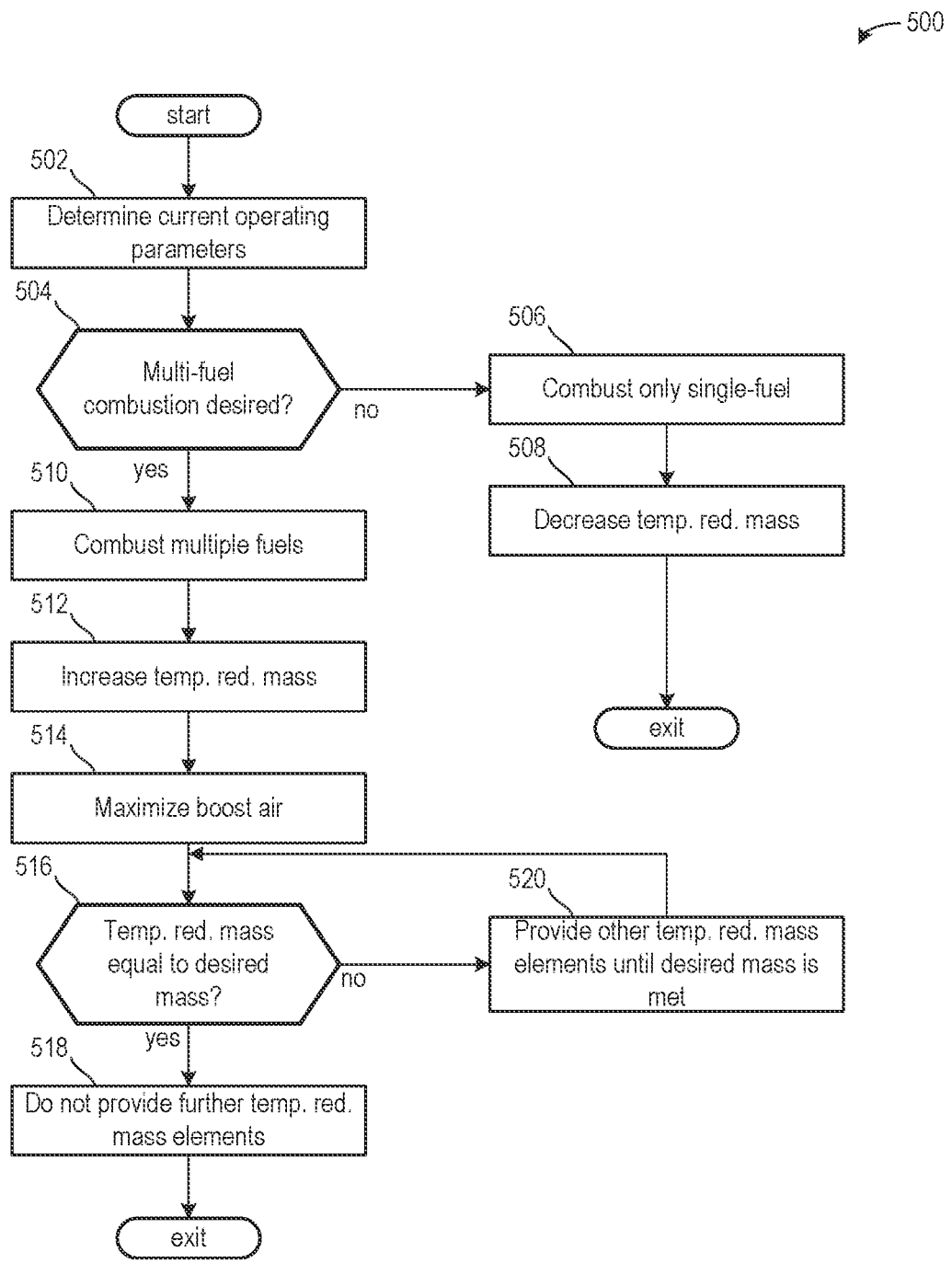
FIG. 5 shows a method for adjusting a temperature reducing mass based on a substitution ratio.
Figure 6:
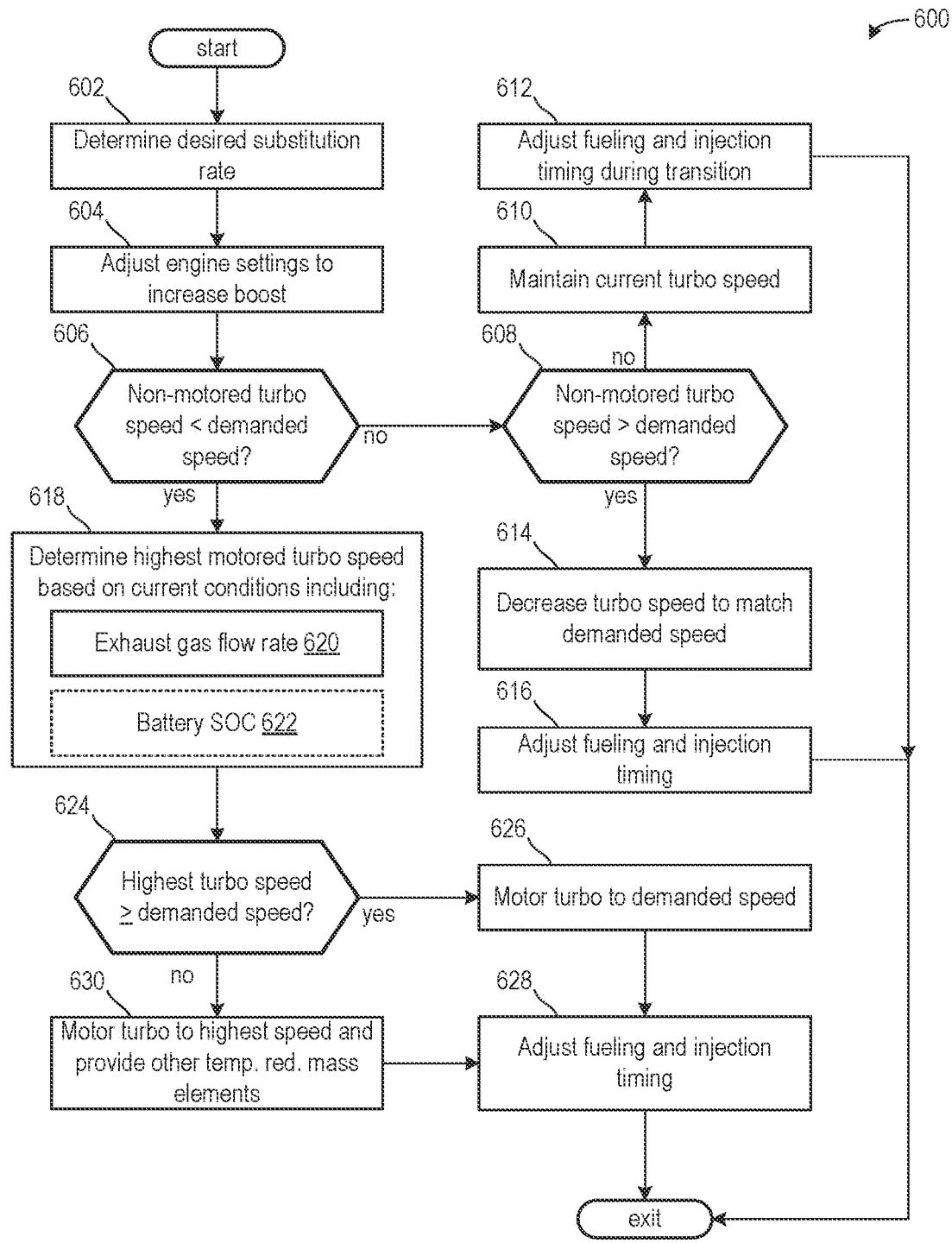
FIG. 6 shows a method for maximizing boost air of the temperature reducing mass.

A more detailed view of a cylinder of the engine and injectors of the fuel system, is shown in FIG. 4. A controller of the vehicle system may use a plurality of different control strategies to adjust exhaust valve timing, diesel injection timing, and ammonia injection location based on substitution ratios, engine temperatures, and exhaust temperatures, as shown in the methods of FIGS. 5 and 6. An example operating sequence is plotted in FIG. 7.

Turning now to FIG. 4, it shows an example cylinder 401 of the engine. The cylinder may be one of a plurality of cylinders that each include at least one intake valve 403, at least one exhaust valve 405. Each of the plurality of cylinders may include at least one direct injector 412 and at least one port injector 422. Each fuel injector may include an actuator that may be actuated via a signal from the controller of the engine. The cylinders of the engine may receive fuel from one or more fuel systems based on operating conditions. The fuel systems may include one or more fuel lines fluidly coupling a fuel tank, a pump, and a fuel rail to one or more of the direct injector and the port injector. More specifically, the direct injector may receive fuel from a first fuel system 410 via a first fuel conduit 411. The port-fuel injector may receive fuel from a second fuel system 420 via a second fuel conduit 421. The first fuel system may supply a carbon-containing fuel and the second fuel system may supply a carbon-free fuel, in one example. The carbon-containing fuel may include one or more of gasoline, diesel, biodiesel, natural gas, HDRD, ether, syn-gas, kerosene, and alcohol. The carbon-free fuel may include one or more of ammonia, and hydrogen. In some examples, the engine may be a spark-free engine. In other examples, the engine may be a spark-ignited engine.

In one example, the engine may combust one or more fuel types delivered thereto. For example, the direct injector may inject the first fuel directly to the cylinder and the port-fuel injector may inject a second fuel directly into an intake port 404. In one example, the first fuel is injected as a liquid fuel and the second fuel is injected as a gaseous fuel. The first fuel and second fuel may mix within an interior volume of the cylinder defined by cylinder walls, a cylinder head, and the piston 402. Following combustion, the exhaust valve may expel combustion products from the cylinder to an exhaust port 406.

During operation, each cylinder within the engine may use a four stroke cycle via actuation of the piston along an axis. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. A port-injection may occur during the intake stroke. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the gases within the combustion chamber. The point at which the piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to the cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. Note that the above is described merely as an example, and that intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

An ignition timing of the engine may be adjusted via either the fuel injection and/or the spark timing. Adjusting one or more of an intake valve timing, a fuel injection timing, a fuel temperature, a fuel pressure, an engine speed, an engine load, an air temperature, an engine temperature, a spark-timing, and boost pressure and/or manifold pressure may allow the fuel injection timing and/or the spark timing to be adjusted from a baseline timing. The ignition timing may be based on a position of the piston during the engine cycle and may be desired at or near TDC of a combustion stroke. A more advanced ignition timing may include where the ignition timing is moved prior to TDC of the combustion stroke and a more retarded ignition timing may include where the ignition timing is moved after TDC of the combustion stroke.

Various surfaces of the engine, the cylinders, the intake manifold, and the exhaust manifold may be galvanized with a coating of zinc or may be coated with another suitable material that can tolerate a chemically reactive environment. Such coatings and coating processes include but are not limited to epoxy coatings, chemical vapor deposition coatings and anodized coatings. The surfaces may be galvanized due to exhaust gas constituents dissolving into water contained therein. For example, $CO_2$ compounds may dissolve into water along with $NO_x$ constituents. The CO and $NO_x$ constituents may protonate into acidic compounds, which along with the $CO_2$ may decrease a pH of the exhaust gas, thereby increasing an acidity of the exhaust gas. At certain EGR flow rates, the exhaust gas may be corrosive. The water content of the exhaust gas may be increased during operating conditions where hydrogen is being combusted. By galvanizing the engine, the corrosiveness of the exhaust gas may be tolerated.

Thus, an engine system may include a multi-fuel engine configured to combust one or more fuels. A first fuel system may provide a first fuel via direct injectors to cylinders of the engine. A second fuel system may provide a second fuel via intake port injectors. A controller with instructions stored thereon may command adjustment of amounts of the second fuel injected by one or more of the injectors of the second fuel system based on one or more operating conditions described with respect to the methods below.

The engine system may further include multiple methods of providing EGR. Herein, EGR is defined as an exhaust gas expelled from a cylinder and returned to the engine for combustion. EGR may be provided via a dedicated donor cylinder, an adjusted exhaust valve timing, and/or the EGR passage. The donor cylinder may expel exhaust gases from its interior volume and flow the exhaust gases to another cylinder fluidly coupled thereto. Additionally or alternatively, the donor cylinder may expel exhaust gases directly to the EGR passage. The adjusted exhaust valve timing may include where an exhaust valve opening may overlap with an intake valve opening, resulting in a vacuum of the cylinder drawing expelled exhaust gases back into the cylinder. In this way, the EGR rate may be set via the donor cylinder(s), the adjusted exhaust valve timing, and/or valve position in the EGR passage.

In another example of the present disclosure, an exhaust valve timing of the cylinders may be adjusted. In one example, the exhaust valve timing may be adjusted for a given cylinder such that a closing time of an exhaust valve during an exhaust stroke is advanced. Exhaust gases in the cylinder may be retained based on the advanced valve timing which includes the exhaust valve closing prior to completion of the exhaust stroke. By doing this, an EGR rate may be increased.

In some examples, additionally or alternatively, the exhaust valve timing may be delayed such that the exhaust valve may be open with an intake valve of the cylinder during an intake stroke. By delaying the timing of exhaust valve closure, exhaust gases may be re-ingested into the cylinder. In one example, as the exhaust valve closure is more delayed, an amount of exhaust gas re-ingested into the cylinder increases, thereby increasing the EGR rate. Re-ingesting EGR may be desired during conditions where an EGR cooler condensate amount is relatively high and/or when an intake manifold temperature is relatively high.

Turning now to FIG. 5, a high-level flowchart shows a method 500 for determining if multi-fuel combustion is desired. The method may be executed by a controller of a vehicle, such as the controller of FIGS. 1-4, based on instructions stored in a memory of the controller.

The method may begin at step 502, where the method may include estimating and/or measuring vehicle operating parameters and/or conditions. Vehicle operating parameters and/or conditions may be estimated based on one or more outputs of various sensors of the vehicle (e.g., such as one or more exhaust temperature sensors, an engine speed, a wheel speed, and/or a turbo shaft speed sensor, a torque sensor, a manifold pressure sensor, etc., as described above in reference to the vehicle system of FIGS. 1-4). Vehicle operating conditions may include engine speed, an engine temperature, and engine torque, vehicle velocity, transmission oil temperature, exhaust gas flow rate, mass airflow rate, coolant temperature, coolant flow rate, engine oil pressures (e.g., oil gallery pressures), cylinder temperatures, operating modes of one or more intake valves and/or one or more exhaust valves, electric motor velocity, battery charge, engine torque output, vehicle wheel torque, and the like. The engine temperature may be based on one or more of an intake temperature, an exhaust temperature, a surface temp of the engine or nearby component, and a temperature of compressed mixture near TDC. Additionally or alternatively, the engine temperature may be calculated or estimated based on one or more of the conditions described above.

At step 504, the method 500 may include determining if multi-fuel combustion is desired. Multi-fuel combustion may be desired based on a multitude of conditions including but not limited to one or more of an emission target, a fuel cost, a combustion mixture efficiency, and a fuel availability. The emission target may be based on an individual vehicle emission target based on a government standard. Additionally or alternatively, the emission target may be based on a local government standard for a geofenced location. For example, a city may include a different emission target than a rural location. A combustion mixture may be customized for a plurality of vehicles operating in the city such that total emissions from the plurality of vehicles may meet local emission targets. By doing this, emission targets of individual vehicles may be exceeded at certain operating points to balance emissions of the plurality of vehicles to meet local emission targets.

In some examples, multi-fuel combustion may be desired based on fuel cost. The fuel cost may be determined via feedback from one or more of a plurality of vehicles, refueling stations, vehicle operators, and so on. An average fuel cost may be determined for each type of fuel included in the consist. For example, if the consist includes diesel, hydrogen, ammonia, and ethanol, costs for each of the fuel types may be determined and a combustion mixture may be adjusted based on at least the costs of the fuel types. In one example, it may be desired to minimize the cost of the combustion mixture.

In further examples, additionally or alternatively, the combustion mixture efficiency may dictate a combustion mixture. The combustion mixture may be adjusted to maximize the combustion mixture efficiency in one example. In other example, the combustion mixture may be adjusted to maximize an engine power output. A vehicle operator may select to prioritize engine power output or the combustion mixture efficiency.

In still further examples, additionally or alternatively, the combustion mixture may be adjusted in response to the fuel availability. In certain locations, one or more of the fuels included in the consist may include a low availability. Consumption of a fuel with low availability may be reduced in some examples. Consumption of a fuel with higher availability may be increased. Fuel availability may be determined based on feedback from a plurality of vehicles and refueling stations. The availability may be determined based on a range from a current location of the vehicle. The range may be equal to a miles remaining based on current fuel levels.

Multi-fuel combustion may include combustion of at least a first fuel and a second fuel. In one example, the first fuel may be a carbon-containing fuel and the second fuel may be a carbon-free fuel including less carbon than the carbon-containing fuel. Multi-fuel combustion may decrease $CO_2$ and/or NO emissions of the vehicle by increasing an amount of the second fuel and decreasing an amount of the first fuel. In one example, the multi-fuel combustion may include diesel as the first fuel and hydrogen as the second fuel. The substitution ratio may be defined as a percentage of total fuel energy provided by the second fuel. Conditions that may impact a substitution ratio may include engine airflow, engine load, intake manifold temperature, ambient pressure and ambient temperature, engine temperature, and exhaust manifold pressure. For example, if the desired substitution ratio is 60%, then the second fuel may provide 60% of the fuel energy and the first fuel may provide 40% of the fuel energy. In one example, an amount of carbon-free fuel increases as the substitution ratio increases.

Additionally or alternatively, in some examples, the desired substitution ratio may be adjusted in response carbon emissions (e.g., $CO_2$, hydrocarbons, and other carbon containing combustion byproducts) and/or NO emissions. For example, as carbon emissions increase, then it may be desired to increase the substitution ratio. Alternatively, as combustion efficiency decreases, it may be desired to decrease the substitution ratio.

Additionally or alternatively, a vehicle controller may select whether multi-fuel combustion is desired based on fuel availability. For example, certain locations may not include fuel stations including alternative fuels such as HDRD, ammonia, hydrogen, and the like. The vehicle controller may request combustion of a single fuel, e.g., if other sources of fuel are not available at local fuel stations. The vehicle controller may be onboard or offboard the vehicle, depending on the selected configuration. In one embodiment, the vehicle controller is an operator that is located onboard the vehicle during operation. As another example, multi-fuel combustion may be desired based on fuel costs. Average fuel costs may be determined via a processor of a central server receiving feedback from controllers of a plurality of controllers of different vehicle systems. The average fuel costs may be determined for each fuel type within various geofenced areas, wherein geofenced areas may include streets, cities, schools, zip codes, states, radii from a current vehicle location, and landmarks.

If multi-fuel combustion is not desired, then at step 506, the method may include combusting only a single fuel. In one example, the single fuel may be a carbon-containing fuel or a non-renewable fuel. In one example, the single fuel is diesel or hydrogen. In some examples, additionally or alternatively, the single fuel may be a renewable fuel, such as HDRD and/or biodiesel.

At step 508, the method may include decreasing a temperature reducing mass. The temperature reducing mass may correspond to a portion of a combustion mixture of a cylinder including air, EGR, water, and one or more alternative and/or secondary fuels. The temperature reducing mass may be reduced during single-fuel combustion due to heat generation being relatively low compared to multi-fuel combustion including some second fuels, such as hydrogen. The ignition timing and engine cooling may meet desired values via adjusting coolant flow rates, valve timing, injection timing, and the like.

Returning to step 504, if multi-fuel combustion is desired, then at step 510, the method may include combusting multiple fuels. In one example, multi-fuel combustion may include at least the first fuel and the second fuel. In the example of the method of FIG. 5, the first fuel is diesel and the second fuel is hydrogen. However, as described above, the multi-fuel engine may combust a plurality of fuels at a plurality of ratios. Hydrogen, may increase a cylinder temperature due to its ignitability. Therefore, it may be desired to decrease cylinder temperatures during conditions that may support multi-fuel combustion to decrease consumption of the first fuel (e.g., carbon-containing fuels). The cylinder temperatures may be reduced via the temperature reducing mass.

At step 512, the method may include increasing the temperature reducing mass. Increasing the temperature reducing mass may include increasing an amount of one or more of air, EGR, and water. Additionally or alternatively, an alternative fuel (e.g., a third fuel) may be included in the temperature reducing mass, wherein the third fuel includes a lower ignitability and/or burn rate then the first and second fuels. The third fuel included in the temperature reducing mass may still be burned during combustion. In one example, the amount of diesel is reduced in response to the third fuel being included with the temperature reducing mass, thereby increasing the substitution ratio. The third fuel may decrease an overall cylinder temperature in a manner similar to other constituents included in the temperature reducing mass.

In one example, a non-fuel mass of the combustion mixture may be increased to a maximum amount prior to introducing a third fuel. The non-fuel mass may include boost, EGR, and water. By doing this, a fuel economy is enhanced while a substitution ratio is met.

In some examples, additionally or alternatively, the combustion conditions may not enhance an ignitability of the third fuel such that it functions as a diluent and not a fuel. As an example, if ammonia is included in the temperature reducing mass, the ammonia may be injected later in a combustion cycle compared to conditions where ammonia is used as a fuel. Additionally or alternatively, the ammonia may be injected into only the intake port and it may be not mixed or minimally premixed with EGR. In one example, when ammonia is used as a temperature reducing mass, the substitution ratio may be unchanged. The ammonia may be used as a non-fuel in response to a reductant load of an aftertreatment device being less than a desired amount. The ammonia may reduce a cylinder temperature and not burn during combustion, followed by flowing to the aftertreatment device and increasing a reductant load thereof. Other examples of third fuels may include alcohols, such as methanol and ethanol.

In some embodiments, when ammonia is included in the temperature reducing mass, the ammonia may demand a relatively high amount of thermal energy to combust at a desired rate. Thus, the ammonia may be used to cool various engine components along with the combustion mixture. For example, the ammonia may be injected toward the exhaust valve, via an exhaust port injector, which may heat the ammonia and cool the exhaust valve. Additionally or alternatively, the ammonia may be used to cool EGR, which may heat the ammonia and cool the EGR, thereby decreasing an overall combustion temperature.

At step 514, the method may include maximizing an amount of boost air in the temperature reducing mass. Boost air may be maximized to decrease operating costs relative to consumption of alternative fuels and/or water. Furthermore, boost air may be more readily available than other temperature reducing mass elements, while also demanding further operating parameter adjustments. In one example, the boost air may be increased to a maximum amount based on a highest available turbo speed. The highest available turbo speed may be based on current operating conditions including one or more of the substitution ratio, a peak cylinder pressure, the engine temperature, and the intake manifold temperature. The peak cylinder pressure may be based on a compression pressure and a combustion pressure rise. Therefore, an increase in boost from a current boost may be based on a balance between the compression pressure and the combustion pressure rise. The increase may be further based on a threshold intake manifold temperature. Maximizing boost to increase the temperature reducing mass in response to a substitution ratio is elaborated in further detail with respect to FIG. 6.

At step 516, the method may include determining if the temperature reducing mass is equal to a desired temperature reducing mass. The desired temperature reducing mass may be based on the substitution ratio, peak cylinder pressure, and the engine temperature. For example, as the substitution ratio increases, the desired temperature reducing mass may increase. An upper limit of the desired temperature reducing mass may be based on the peak cylinder pressure remaining below a threshold peak cylinder pressure. The desired temperature reducing mass may increase as the engine temperature increases. For example, despite boost air being hotter than non-boosted airflow, the boost air may still provide a cooling effect when combusting multiple fuels including where one of the multiple fuels is hydrogen. The temperature reducing mass may allow an ignition timing to be adjusted to a desired timing to mitigate knock, which may allow a greater plurality of engine conditions to be executed via multi-fuel combustion.

If the temperature reducing mass is equal to the desired temperature reducing mass, then at step 518, the method may include not providing further temperature reducing mass elements, such as water, EGR, and ammonia.

If the temperature reducing mass is not equal to the desired temperature reducing mass (e.g., less than), then at step 520, the method may include providing other temperature reducing mass elements until the desired temperature reducing mass is met. In one example, the controller may signal to an injector to inject ammonia into intake ports of the engine, wherein the injection timing and combustion conditions promote ammonia to function as a diluent. As another example, water may be injected or flowed to the engine. Water may be captured as condensate in the EGR cooler or as a byproduct of hydrogen combustion.

Thus, in one example, a method may include increasing a non-fuel mass of a cylinder during a transition to multi-fuel combustion, including a first fuel and a second fuel, from single-fuel combustion including only the first fuel. An amount of the non-fuel mass is proportional to an engine temperature, wherein the engine temperature may be determined based on one or more of one or more of an intake temperature, an exhaust temperature, a surface temp of the engine or nearby component, and a temperature of compressed mixture near TDC. Additionally or alternatively, the engine temperature may be calculated or estimated based on one or more of the conditions described above. The non-fuel mass may include one or more of air, EGR, and water. Once a non-fuel mass threshold is met, if the cylinder temperature is still above a desired temperature, then a third fuel, such as ammonia or an alcohol, may be included with the combustion mixture. The reduced ignitability of the ammonia and/or the alcohol may continue to decrease the cylinder temperature. The amount of first fuel may be reduced to allow the third fuel to be included. In one example, the first fuel is diesel, the second fuel is hydrogen, and the third fuel is ammonia, methanol, or ethanol.

Turning now to FIG. 6, a method 600 for maximizing boost in a temperature reducing mass is shown. At step 602, the method may include determining a desired substitution ratio. The desired substitution ratio may be based on one or more of an emission target, a fuel cost, a combustion mixture efficiency, and a fuel availability, as described above. The desired substitution ratio may be further based on an engine speed, an engine load, an ambient pressure, and an ambient temperature. In one example, the desired substitution ratio may be increased in response to a lower engine speed, a lower engine load, a higher ambient pressure, and a lower ambient temperature. Therefore, the desired substitution ratio may be decreased in response to a higher engine speed, a higher engine load, a lower ambient pressure, and a higher ambient temperature. In one example, the desired substitution ratio defines an amount of the first fuel and the second fuel provided to the multi-fuel engine, wherein the amount of the second fuel increases as the desired substitution ratio increases.

In one example, the first fuel is diesel and the second fuel is hydrogen. The amount of hydrogen provided to the engine may increase as the substitution ratio increases. A higher substitution ratio may be provided to the engine during lower engine loads due to a likelihood of knock and/or pre-ignition at higher loads. In some examples, the combustion mixture may be provided with additional fuels less combustible than hydrogen at higher engine loads to decrease consumption of diesel or other non-renewable carbon-containing fuels.

At step 604, the method may include adjusting engine settings to increase boost, which is equal to an intake manifold pressure. The boost may be increased toward a desired boost amount based on a peak cylinder pressure, turbocharger speed limits, and emission limits. The peak cylinder pressure may be sensed via an in-cylinder pressure sensor or estimated based on a manifold pressure and temperature or may be estimated based on other engine parameters. Turbocharger speed limits may be based on one or more of a choke limit, mechanical properties of a compressor and/or a turbine, manifold pressure and temperature, the engine temperature, the in-cylinder pressure, and an EGR flow rate. Additionally or alternatively, a current maximum turbocharger speed may be limited based on the threshold peak cylinder pressure. If the peak cylinder pressure is approaching the threshold peak cylinder pressure, then the current maximum turbocharger speed may be reduced to avoid exceeding the threshold peak cylinder pressure.

At step 606, the method may include determining if a non-motored turbo speed is less than the demanded turbo speed. In one example, the non-motored turbo speed is equal to a current turbo speed without assistance from an electric motor or the engine. The demanded turbo speed may be proportional to the desired boost. The non-motored turbo speed may be based on an exhaust gas flow rate, a nozzle vane position, a throttle position, an engine load, an airflow rate, and an intake manifold temperature without increasing its speed via the electric motor or engine.

If the non-motored turbo speed is not less than the demanded speed (e.g., greater than or equal to), then at step 608, the method may include determining if the non-motored turbo speed is greater than the demanded speed. In one example, the non-motored turbo speed may be greater than the demanded speed during higher loads, where exhaust gas flow through the turbine is relatively high. If the non-motored turbo speed is not greater than the demanded speed, then at step 610, the method may include maintaining the current turbo speed.

At step 612, the method may include adjusting fueling and an injection timing during a transition from single fuel combustion to multi-fuel combustion. Adjusting fueling may include adjusting an amount of the first fuel and an amount of the second fuel to match the desired substitution ratio. In one example, the amount of the first fuel is decreased and the amount of the second fuel is increased. The injection timing of one or more of the first fuel and the second fuel may be adjusted based on a desired ignition timing. In one example, an EGR flow rate may further influence the injection timing. In one example, a first fuel injection timing and/or a second fuel injection timing may be retarded in response to EGR flowing to the engine. A magnitude of the retarding may be proportional to the EGR flow rate. Thus, the first fuel injection timing and the second fuel injection timing may be more retarded as the EGR flow rate increases.

In one example, the injection timing may be retarded when EGR is provided due to an intake in the intake manifold temperature. Additionally or alternatively, the injection timing may be advanced when EGR is provided to reduce a likelihood of knock and $NO_x$ emissions. The injection timing when EGR is provided may be selected based on current emissions output, knock likelihood, and the intake manifold temperature.

If the non-motored turbo speed is greater than the demanded turbo speed, then at step 614, the method may include decreasing the turbo speed to match the demanded turbo speed. In one example, decreasing the turbo speed may include slowing a shaft speed of the turbo via an electric motor or generator. The electric motor may enter a generator mode and decrease the turbo speed via slowing the shaft, which may replenish a state-of-charge (SOC) of the battery while also allowing the desired airflow rate to be realized, and therefore the desired temperature reducing mass to be met. Additionally or alternatively, the turbine may be used to drive wheels with the engine, which may increase an electric motor efficiency. By using the turbo to assist the engine in driving the wheels, the airflow rate generated by the compressor may be reduced to match the desired airflow rate. Alternatively, the turbocharger speed may be decreased using a wastegate valve to bypass some exhaust energy around the turbocharger turbine.

At step 616, the method may include adjusting the fueling and injection timing based on the desired substitution ratio, similar to step 612.

Returning to step 606, if the non-motored turbo speed is less than the demanded turbo speed for the desired substitution ratio, then at step 618, the method may include determining a highest motored turbo speed during current conditions. Current conditions may include but are not limited to one or more of a current exhaust gas flow rate 620 and optionally a battery state-of-charge (SOC) 622. The current exhaust gas flow rate may be sensed via an exhaust gas flow sensor. The current exhaust gas flow rate may be based on one or more of an engine load, a throttle position, an air/fuel ratio, and a high pressure exhaust gas recirculation (HP-EGR) rate.

The battery SOC may be sensed via a device sensing a battery voltage. Additionally or alternatively, the battery SOC may be tracked over time by measuring a current flow to and from the battery. The highest turbo speed may be based on each of the exhaust gas flow rate and the battery SOC. In one example, the highest turbo speed may be calculated based on turbine conditions increase the turbine speed, and therefore the turbo speed. For example, the highest turbo speed may be calculated based on the wastegate being closed, the nozzle vanes being open, and an HP-EGR rate being relatively low.

At step 624, the method may include determining if the highest motored turbo speed is greater than or equal to the demanded turbo speed. If the highest motored turbo speed is greater than or equal to the demanded turbo speed, then the desired manifold pressure may be met via a combination of exhaust gas and the electric motor driving the turbo.

At step 626, the method may include motoring the turbo to match the demanded turbo speed. In one example, the electric motor may increase the turbine and turbo speeds. In another example, the engine may be operated to increase the turbine and turbo speeds. An engine power may be increased to a power output greater than a driver demand. The extra power, equal to the difference between the engine power and the driver demanded power, may be used to drive the compressor and provide an additional amount of airflow. In one example, the turbo may be driven to a current maximum speed based on current conditions or to a lower speed than the current maximum speed based on the demanded turbo speed.

At step 628, the method may include adjusting the fueling and injection timing, as described above.

In some examples of the method, if a current substitution ratio is at the desired substitution ratio and a current airflow rate is greater than a desired airflow rate, the desired airflow rate based on the desired substitution ratio, then the current airflow rate may be reduced. Additionally or alternatively, the desired substitution ratio may be increased to a substitution ratio corresponding to the current airflow rate.

If the highest motored turbo speed is not greater than or equal to the demanded turbo speed, then at step 630, the method may include motoring the turbo to the highest speed and providing other temperature reducing mass elements. In one example, if the battery SOC is less than a threshold SOC, then a desired amount of electrical energy from the battery may not be available to drive the turbo to the demanded turbo speed. In another example, the engine may not be driven to increase the turbo speed based on current operating conditions. For example, if the driver demand is relatively high, then the maximum speed of the turbo may be reduced. As another example, the engine power output may be limited based on local emissions guidelines and other external factors.

An amount of other temperature reducing mass elements provided may be proportional to a difference between the current maximum motored turbo speed and the desired turbo speed. As the difference increases, then the amount of other temperature reducing mass elements may also increase. The other temperature reducing mass elements may include EGR, water, ammonia, alcohols, and other elements that may reduce a cylinder temperature. Ammonia may be used as a fuel during other multi-fuel combustion operating parameters. However, during the examples of FIGS. 5 and 6, ammonia may be used as a fuel and a temperature reducing element due to its reduced ignitability. The ammonia, if used, may be provided to the engine with a lower temperature and reduced atomization to promote thermal reduction in the cylinder. In one example, if ammonia is used as a diluent, wherein the ammonia does not burn during combustion, then the ammonia may be available in the exhaust stream to be used as a reductant in the aftertreatment system. While this may further enhance the temperature reducing properties of ammonia in the temperature reducing mass, the ammonia may be used as a diluent only when reductant is demanded by the aftertreatment system. In some example, an amount of ammonia burn may be proportional to a reductant demand of the aftertreatment system and the cylinder temperature.

Figure 7:
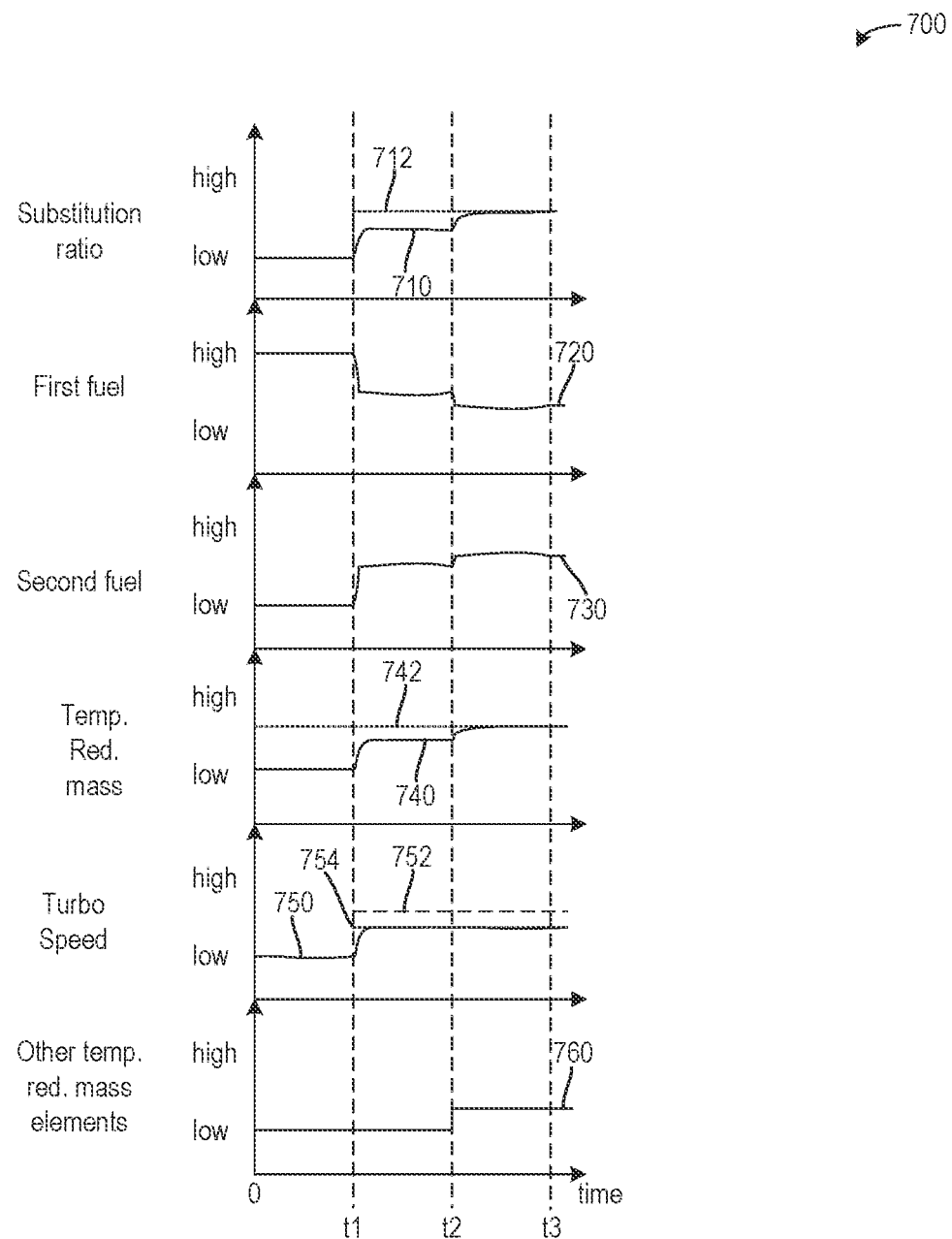
FIG. 7 shows a timeline illustrating adjustments to combustion conditions based on the temperature reducing mass and substitution ratio.

Turning now to FIG. 7, it shows a graph 700 graphically illustrating one or more adjustments to engine operating conditions in response to a selected substitution ratio. Plot 710 illustrates a substitution ratio and dashed line 712 illustrates a desired (e.g., a selected) substitution ratio. Plot 720 illustrates an amount of a first fuel delivered to the engine. Plot 730 illustrates an amount of a second fuel delivered to the engine. Plot 740 illustrates a total temperature reducing mass and dashed line 742 illustrates a desired temperature reducing mass. Plot 750 illustrates a turbo speed, dashed line 752 illustrates a desired turbo speed, and dashed line 754 illustrates a maximum turbo speed. Plot 760 illustrates a temperature reducing mass of elements different than boost air. Time increases along an abscissa from a left to right side of the figure. Values for each plot may fluctuate along the ordinates.

Prior to t1, the substitution ratio is relatively low and equal to a desired substitution ratio, resulting in a high amount of first fuel and a low amount of second fuel provided to the engine. In one example, the relatively low substitution ratio may correspond to a single fuel operation, wherein only the first fuel is provided to the engine and the second fuel is not. In one example, the first fuel may be diesel. As described above, the first fuel may be other carbon-containing fuels. The temperature reducing mass may be relatively low due to cylinder temperatures being relatively low during single-fuel combustion.

At t1, the selected substitution ratio increases. In one example, an engine operating condition may change from a first condition, where only the first fuel is desired, to a second condition, where both the first and second fuels are desired.

Between t1 and t2, the amount of first fuel decreases and the amount of second fuel increases. The turbo speed is increased to the current maximum turbo speed, which is less than the desired turbo speed. As such, the amount in which the total temperature reducing mass increases is less than the desired temperature reducing mass. The substitution ratio may not increase to the desired substitution ratio due to the temperature reducing mass being less than the desired temperature reducing mass.

In one example, the desired temperature reducing mass may be based on a difference between a current cylinder temperature and a threshold cylinder temperature. As the difference decreases, the desired temperature reducing mass may increase to further reduce a temperature rise of the cylinder due to multi-fuel combustion. For an engine including a plurality of cylinders, the desired temperature reducing mass may be customized for each of the plurality of cylinders based on temperatures thereof. The temperature reducing mass delivered to each of the plurality of cylinders may be adjusted via EGR provided by donor cylinders, water injections, and ammonia injections. Thus, in an example wherein each of the plurality of cylinders demands a different temperature reducing mass, the turbo speed may be increased to meet a lowest desired temperature reducing mass of the plurality of cylinders. Ammonia injections to each of the plurality of cylinders may then be customized to meet the difference between the boost flow and the desired temperature reducing mass.

At t2, other temperature reducing mass elements are provided to the engine. In one example, ammonia may be provided to the engine via intake port injectors. Additionally or alternatively, an EGR flow rate may be increased. Additionally or alternatively, water may be provided to the engine. The amount of other temperature reducing mass elements provided may proportional to the difference between a current temperature reducing mass, which is based on the current turbo speed, and the desired temperature reducing mass. Between t2 and t3, the substitution ratio increases to match the desired substitution ratio. The first fuel decreases and the second fuel increases. The substitution ratio and temperature reducing mass are maintained at t3 and after.

The technical effect of increasing a temperature reducing mass in response to a substitution ratio is to decrease cylinder temperature increases, while promoting combustion conditions with increased use of carbon-free fuels. By doing this, consumption of carbon-containing fuels may be reduced across a broader range of operating conditions.

The disclosure provides support for a method including increasing a temperature reducing mass of a combustion mixture during a transition to multi-fuel combustion from single-fuel combustion. A first example of the method further includes where an amount of the temperature reducing mass is proportional to an engine temperature. A second example of the method, optionally including the first example, further includes where the temperature reducing mass includes one or more of air, EGR, and water. A third example of the method, optionally including one or more of the previous examples, further includes providing ammonia to the combustion mixture during the transition. A fourth example of the method, optionally including one or more of the previous examples, further includes increasing the temperature reducing mass comprises providing an additional amount of boost, wherein the additional amount of boost is based on a peak cylinder pressure. A fifth example of the method, optionally including one or more of the previous examples, further includes increasing a boost airflow based on one or more of an EGR flow rate, a battery SOC, a driver demand, and a peak cylinder pressure. A sixth example of the method, optionally including one or more of the previous examples, further includes retarding an injection timing of at least one of the fuels provided to the combustion mixture. A seventh example of the method, optionally including one or more of the previous examples, further includes where the multi-fuel combustion comprises two or more of gasoline, diesel, hydrogenation-derived renewable diesel (HDRD), alcohol, ether, ammonia, biodiesel, hydrogen, natural gas, kerosene, and syn-gas.

The disclosure further provides support for a system including a first fuel system containing a first fuel, a second fuel system containing a second fuel different than the first fuel, a turbocharger comprising a turbine and a compressor, and a controller comprising computer-readable instructions stored on non-transitory memory thereof that when executed enable the controller to adjust a temperature reducing mass of a combustion mixture in response to a desired substitution ratio. A first example of the system further includes where the instructions further enable the controller to increase the temperature reducing mass in response to the desired substitution ratio increasing. A second example of the system, optionally including the first example, further includes where the first fuel system is coupled to a direct injector positioned to inject directly into a volume of a cylinder of an engine, and wherein the second fuel system is coupled to a port-injector positioned to inject into an intake port of the cylinder. A third example of the system, optionally including one or more of the previous examples, further includes where the instructions further enable the controller to adjust a speed of the turbocharger in response to a current substitution ratio being less than a desired substitution ratio and an airflow rate being less than a desired airflow rate. A fourth example of the system, optionally including one or more of the previous examples, further includes where the current substitution ratio is based on a current maximum speed of the turbocharger, wherein the current maximum speed of the turbocharger is based on one or more operating parameters of an engine. A fifth example of the system, optionally including one or more of the previous examples, further includes where the first fuel is diesel and the second fuel is hydrogen. A sixth example of the system, optionally including one or more of the previous examples, further includes where the instructions further enable the controller to increase the temperature reducing mass of the combustion mixture in response to the desired substitution ratio increasing, wherein the desired substitution ratio is based on an engine load.

The disclosure further provides support for a method including selecting a substitution ratio in response to an engine load and adjusting a temperature reducing mass of a combustion mixture based on at least the substitution ratio. A first example of the method further includes adjusting the temperature reducing mass is in further response to an engine temperature. A second example of the method, optionally including the first example, further includes where adjusting the temperature reducing mass temperature reducing mass comprises increasing the temperature reducing mass temperature reducing mass in response to one or more of the substitution ratio increasing or the engine temperature increasing. A third example of the method, optionally including one or more of the previous examples, further includes where the temperature reducing mass temperature reducing mass comprises boost air, and wherein an amount of boost air in the temperature reducing mass temperature reducing mass is based on a peak cylinder pressure. A fourth example of the method, optionally including one or more of the previous examples, further includes where the amount of boost air in the temperature reducing mass is maximized prior to adding other non-fuel elements.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
increasing a temperature reducing mass of a combustion mixture delivered into a cylinder of an engine via an intake passage and at least one injector during a transition to multi-fuel combustion from single-fuel combustion based on a desired substitution ratio; and
limiting a substitution ratio to less than the desired substitution ratio in response to the temperature reducing mass being less than a desired temperature reducing mass.

2. The method of claim 1, wherein an amount of the desired temperature reducing mass is proportional to an engine temperature.

3. The method of claim 1, wherein the temperature reducing mass includes one or more of air, EGR, and water.

4. The method of claim 1, further comprising providing ammonia to the combustion mixture during the transition.

5. The method of claim 1, wherein increasing the temperature reducing mass comprises providing an additional amount of boost, wherein the additional amount of boost is based on a peak cylinder pressure, further comprising providing a second temperature reducing mass in response to the additional amount of boost not being equal to the desired temperature reducing mass.

6. The method of claim 1, further comprising increasing a boost airflow based on one or more of an EGR flow rate, a battery SOC, a driver demand, and a peak cylinder pressure.

7. The method of claim 1, further comprising retarding an injection timing of at least one of the fuels provided to the combustion mixture.

8. The method of claim 1, wherein the multi-fuel combustion comprises two or more of gasoline, diesel, hydrogenation-derived renewable diesel (HDRD), alcohol, ether, ammonia, biodiesel, hydrogen, natural gas, kerosene, and syn-gas.

9. A system, comprising:
a first fuel system containing a first fuel;
a second fuel system containing a second fuel different than the first fuel;
a turbocharger comprising a turbine and a compressor; and
a controller comprising computer-readable instructions stored on non-transitory memory thereof that when executed enable the controller to:
adjust a temperature reducing mass of a combustion mixture delivered into a cylinder of an engine via an intake passage and at least one injector in response to a desired substitution ratio changing in response to a speed of the turbocharger; and limit a substitution ratio to a ratio less than a desired substitution ratio in response to the temperature reducing mass being less than a desired temperature reducing mass.

10. The system of claim 9, wherein the instructions further enable the controller to increase the temperature reducing mass in response to the desired substitution ratio increasing.

11. The system of claim 9, wherein the first fuel system is coupled to a direct injector positioned to inject directly into a volume of a cylinder of an engine, and wherein the second fuel system is coupled to a port-injector positioned to inject into an intake port of the cylinder.

12. The system of claim 9, wherein the instructions further enable the controller to adjust a speed of the turbocharger in response to a current substitution ratio being less than a desired substitution ratio and an airflow rate being less than a desired airflow rate.

13. The system of claim 12, wherein the current substitution ratio is based on a current maximum speed of the turbocharger, wherein the current maximum speed of the turbocharger is based on one or more operating parameters of an engine.

14. The system of claim 9, wherein the first fuel is diesel and the second fuel is hydrogen.

15. The system of claim 9, wherein the instructions further enable the controller to increase the temperature reducing mass of the combustion mixture in response to the desired substitution ratio increasing, wherein the desired substitution ratio is based on an engine load.

16. A method, comprising:
selecting a substitution ratio in response to an engine load;
adjusting a temperature reducing mass of a combustion mixture delivered into a combustion chamber of an engine via one or more of an intake passage and an injector based on at least the substitution ratio; and
limiting the substitution ratio to a ratio below the selected substitution ratio in response to the temperature reducing mass being less than a desired temperature reducing mass.

17. The method of claim 16, wherein adjusting the temperature reducing mass is in further response to an engine temperature.

18. The method of claim 17, wherein adjusting the temperature reducing mass comprises increasing the temperature reducing mass in response to one or more of the substitution ratio increasing or the engine temperature increasing.

19. The method of claim 16, wherein the temperature reducing mass comprises boost air, and wherein an amount of boost air in the temperature reducing mass is based on a peak cylinder pressure.

20. The method of claim 19, wherein the amount of boost air in the temperature reducing mass is maximized prior to adding other non-fuel elements to a total temperature reducing mass.

* * * * *